United States Patent
Lee (10) Patent No.: US 10,514,073 B2
(45) Date of Patent: Dec. 24, 2019

(54) BEARING WITH INTEGRATED WEDGE LOCKING ASSEMBLY

(71) Applicant: Schaeffler Technologies AG & Co. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 216 days.

(21) Appl. No.: 15/690,868

(22) Filed: Aug. 30, 2017

(65) Prior Publication Data

US 2019/0063510 A1 Feb. 28, 2019

(51) Int. Cl.
| | |
|---|---|
| F16D 41/061 | (2006.01) |
| F16C 41/00 | (2006.01) |
| F16D 25/00 | (2006.01) |
| F16C 19/06 | (2006.01) |
| F16D 15/00 | (2006.01) |
| F16D 27/00 | (2006.01) |
| F16D 41/06 | (2006.01) |
| B60K 17/02 | (2006.01) |

(52) U.S. Cl.
CPC .......... F16D 41/061 (2013.01); F16C 41/001 (2013.01); F16D 15/00 (2013.01); F16D 25/00 (2013.01); F16D 27/00 (2013.01); B60K 17/02 (2013.01); F16C 19/06 (2013.01); F16C 2361/41 (2013.01); F16D 2041/0605 (2013.01)

(58) Field of Classification Search
CPC ........................ F16C 41/001; F16D 2041/0601
See application file for complete search history.

(56) References Cited

U.S. PATENT DOCUMENTS

| | | | |
|---|---|---|---|
| 6,279,708 B1 | 8/2001 | Yatabe et al. | |
| 6,588,560 B1 | 7/2003 | Fujiwara | |
| 6,640,949 B1* | 11/2003 | Vranish | F16D 41/07 192/110 B |
| 8,272,487 B2* | 9/2012 | Sato | F16D 41/088 192/110 B |
| 2007/0163853 A1 | 7/2007 | Wittkopp | |
| 2014/0291099 A1* | 10/2014 | Sturgin | F16D 13/14 192/43 |
| 2015/0204394 A1* | 7/2015 | Luo | F16D 41/06 192/45.1 |

FOREIGN PATENT DOCUMENTS

| | | |
|---|---|---|
| JP | 07-317811 A | 12/1995 |
| JP | 5418653 B2 | 2/2014 |

\* cited by examiner

*Primary Examiner* — Mark A Manley
(74) *Attorney, Agent, or Firm* — Volpe and Koenig, P.C.

(57) ABSTRACT

A drive assembly including a wedge clutch assembly is disclosed. The wedge clutch assembly includes a first cage having a first plurality of tapered crossbars that at least partially define a plurality of tapered wedge pockets. A plurality of wedges are each arranged within a respective one of the plurality of wedge pockets and within a circumferential groove of one of an outer ring or an inner ring. The plurality of wedges each including a ramped surface facing a corresponding one of a plurality of ramps defined in the outer ring or inner ring. Movement of the first plurality of tapered crossbars in a first axial direction or a second axial direction circumferentially drives the plurality of wedges into contact with the circumferential groove such that an input drive gear drives an output.

19 Claims, 7 Drawing Sheets

Fig. 7

BEARING WITH INTEGRATED WEDGE LOCKING ASSEMBLY

FIELD OF INVENTION

This invention is generally related to a drive assembly, and is more particularly related to a disconnect arrangement for a drive assembly.

BACKGROUND

Disconnect clutches are used in a variety of applications. For example, all-wheel drive (AWD) and hybrid vehicles are known applications that use an integrated axle disconnect clutch. A bearing assembly is typically arranged between two rotating shafts which are configured to be connected and disconnected from each other. Existing disconnect assemblies for drive assemblies typically require additional components or require additional space.

It would be desirable to provide a drive assembly that is both efficient to manufacture and relatively compact, that provides a reliable disconnect arrangement.

SUMMARY

A drive assembly including a wedge clutch assembly with a compact construction is provided. The drive assembly includes an input drive gear and an output adapted to be selectively driven by the input drive gear. A bearing assembly includes an outer ring on the input drive gear defining an outer raceway, an inner ring on the output defining an inner raceway, and a plurality of rolling elements supported to run on the outer raceway and the inner raceway. A first one of the outer ring or the inner ring includes a plurality of ramps, and a second one of the outer ring or the inner ring includes a circumferential groove. A wedge clutch assembly includes a first cage having a first plurality of tapered crossbars that at least partially define a plurality of tapered wedge pockets. A plurality of wedges are each arranged within a respective one of the plurality of wedge pockets and within the circumferential groove of the second one of the outer ring or the inner ring. The plurality of wedges each include a ramped surface facing a corresponding one of the plurality of ramps. An actuator is configured to axially move the cage of the wedge clutch assembly in at least one of a first axial direction or a second axial direction. Movement of the first plurality of tapered crossbars in one of the first axial direction or the second axial direction circumferentially drives the plurality of wedges into contact with the circumferential groove such that the input drive gear drives the output. The first cage includes a second plurality of tapered crossbars having a taper direction opposite to a taper direction of the first plurality of tapered crossbars, and movement in the other of the first axial direction or the second axial direction drives the plurality of wedges out of contact with the circumferential groove such that the input drive gear freely rotates with respect to the output.

Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in FIGS. 1-7, a drive assembly 10 is illustrated. The drive assembly 10 includes an input drive gear 20 and an output 30 adapted to be selectively driven by the input drive gear 20. The output 30 can include any type of output element, such as a shaft, housing, carrier, or other known type of output element. Additionally, the input drive gear 20 can be realized by any type of known input element.

Figure 4:
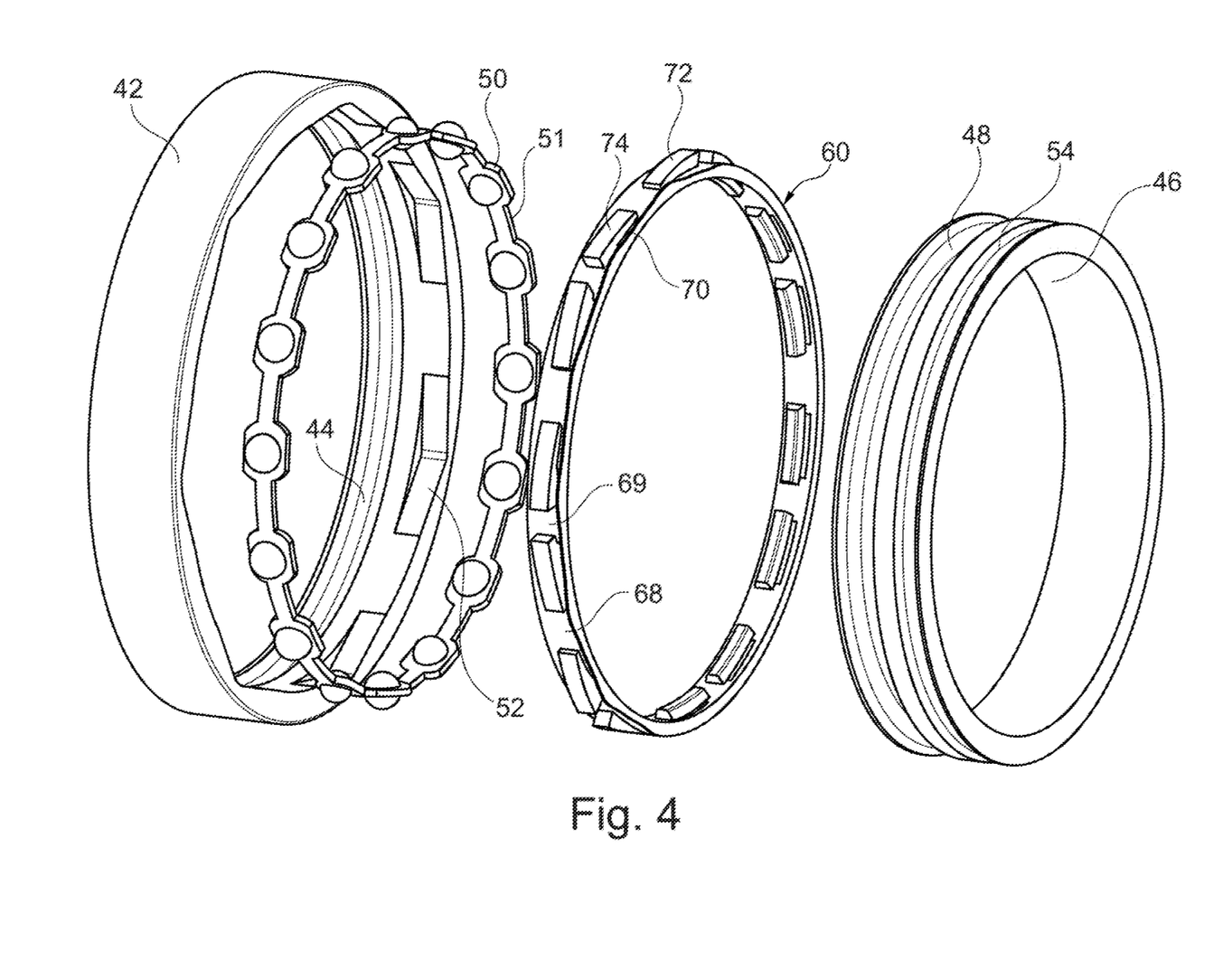
FIG. 4 is an exploded view of a bearing assembly and a wedge clutch assembly of FIGS. 1-3.

The drive assembly 10 includes a bearing assembly 40 arranged between the input drive gear 20 and the output 30. The bearing assembly 40 includes an outer ring 42 on the input drive gear 20 defining an outer raceway 44, and an inner ring 46 on the output 30 defining an inner raceway 48. The outer ring 42 and the inner ring 46 are identified as a first ring and a second ring in one embodiment. As shown in FIG. 4, the bearing assembly 40 includes a plurality of rolling elements 50 supported to run on the outer raceway 44 and the inner raceway 48. The rolling elements 50 are illustrated as spherical rolling elements, but one of ordinary skill in the art would recognize from the present disclosure that alternative types of rolling elements can be used. In one embodiment, a cage 51 supports the plurality of rolling elements 50. A first one of the outer ring 42 or the inner ring 46 includes a plurality of ramps 52, and a second one of the outer ring 42 or the inner ring 46 includes a circumferential groove 54.

Figure 5:
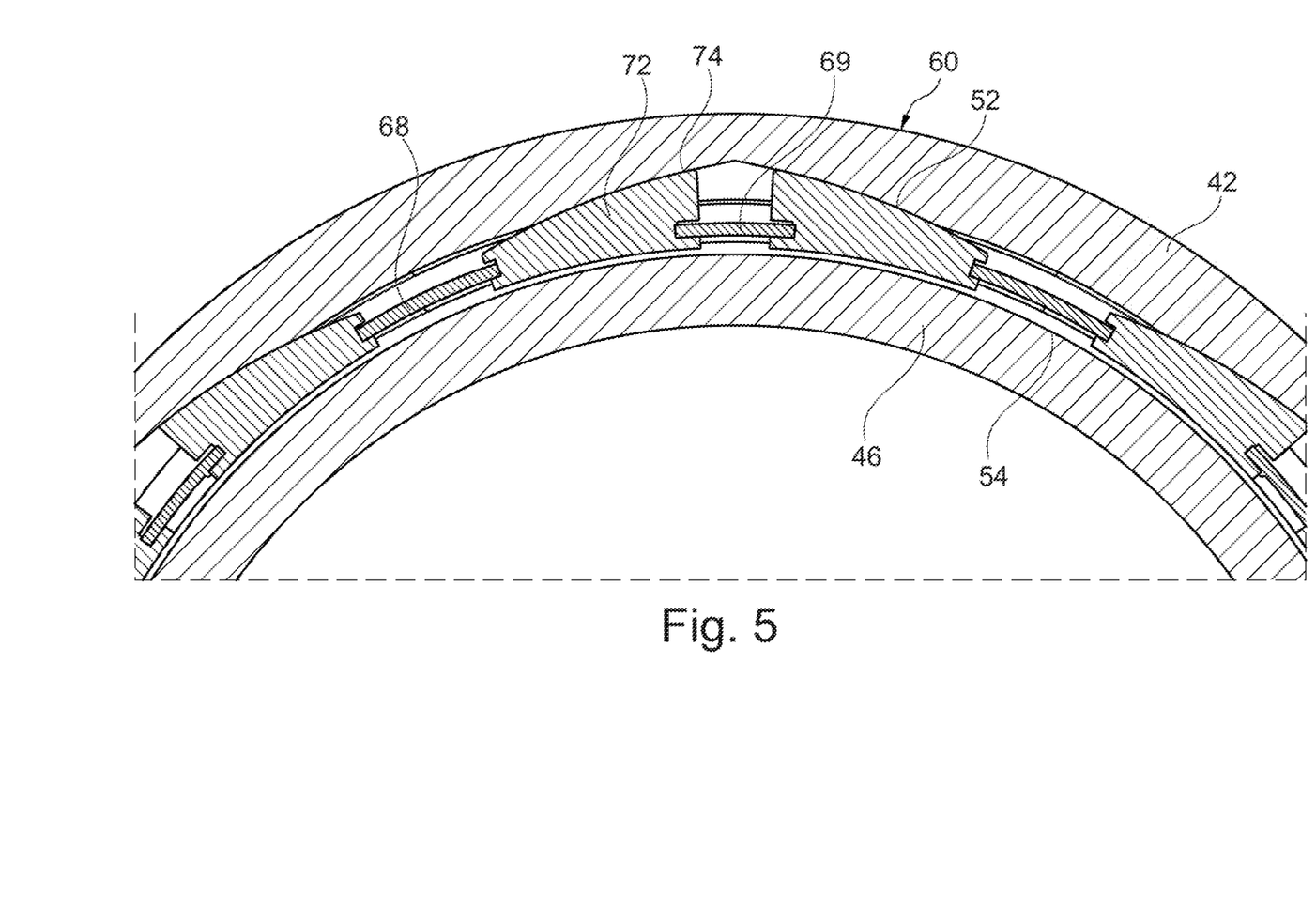
FIG. 5 is a magnified front view of the wedge clutch assembly of FIGS. 1-4.
Figure 6:
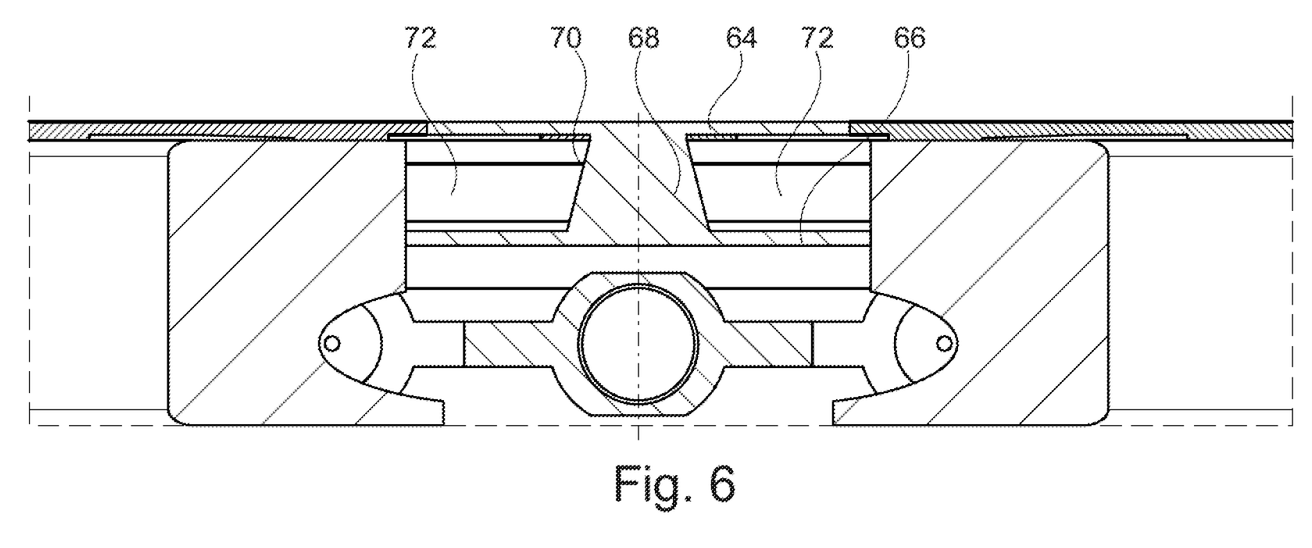
FIG. 6 is a magnified top view of the wedge clutch assembly of FIGS. 1-5.
Figure 7:
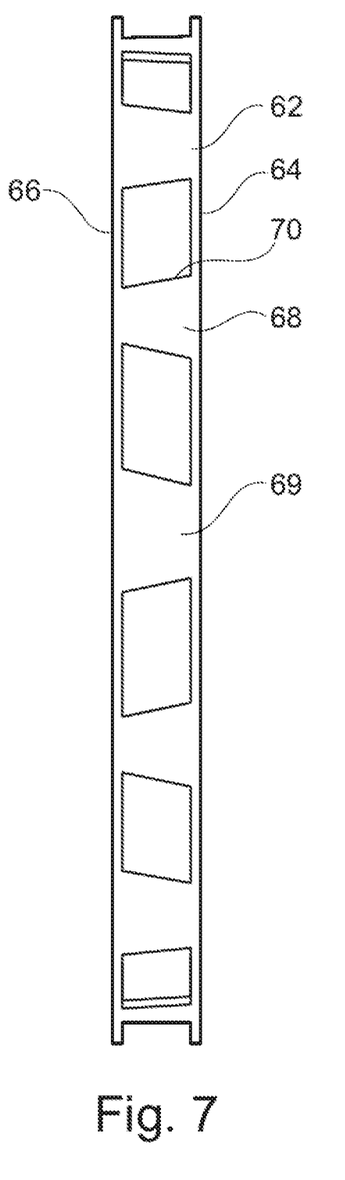
FIG. 7 is a side view of a cage for the wedge clutch assembly of FIGS. 1-6.

As shown in FIGS. 4-6, a wedge clutch assembly 60 includes a first cage 62 (shown more clearly in FIG. 7) having a first radial flange 64, a second radial flange 66, a first plurality of tapered crossbars 68 extending therebetween to at least partially define a plurality of tapered wedge pockets 70. In one embodiment, the first radial flange 64 and the second radial flange 66 both extend radially outwardly. A plurality of wedges 72 are each arranged within a respective one of the plurality of wedge pockets 70 and within the circumferential groove 54 of the second one of the outer ring 42 or the inner ring 46. The plurality of wedges 72 each include a ramped surface 74 facing a corresponding one of the plurality of ramps 52. The plurality of ramps 52 each define a first profile, and the ramped surfaces 74 of the plurality of wedges 72 each define a second profile that is complementary to the first profile. In one embodiment, the first one of the outer ring 42 or the inner ring 46 including the plurality of ramps 52 is the outer ring 42, and the second one of the outer ring 42 or the inner ring 46 including the circumferential groove 54 is the inner ring 46. One of ordinary skill in the art would recognize from the present disclosure that this configuration can be reversed.

In one embodiment, an actuator assembly 80 is configured to axially move the cage 62 in at least one of a first axial direction or a second axial direction. In one embodiment, a biasing element 82 is configured to axially move the cage 62 in the second axial direction. In one embodiment, the biasing element 82 is a coil spring. One of ordinary skill in the art would recognize from the present disclosure that alternative types of biasing elements can be used, such as a plate spring. The actuator assembly 80 selectively engages the first cage 62 of the wedge clutch assembly 60 to axially move the first cage 62 in a first direction, and the biasing element 82 axially moves the first cage 62 in a second direction opposite from the first direction. Movement of the first plurality of tapered crossbars 68 in one of the first direction or the second direction circumferentially drives the plurality of wedges 72 into contact with the circumferential groove 54 such that the input drive gear 20 drives the output 30. In one embodiment, axial movement of the crossbars 68 circumferentially slides the wedges 72 along the associated ramps 52, and the wedges 72 are driven radially inward or outward with respect to the circumferential groove 54, such that the wedges 72 are selectively driven into contact with the circumferential groove 54.

In one embodiment, the first cage 62 includes a second plurality of tapered crossbars 69 having a taper direction opposite to a taper direction of the first plurality of tapered crossbars 68, and movement in the other of the first direction or the second direction drives the plurality of wedges 72 out of contact with the circumferential groove 54 such that the input drive gear 20 freely rotates with respect to the output 30. This arrangement provides a compact disconnect between the input drive gear 20 and the output 30 that is integrated into the bearing assembly 40. One of ordinary skill in the art would recognize from the present disclosure that the configuration of sub-components of the wedge clutch assembly 60 can modified, such as the shape and taper of the first cage 62 and the plurality of wedges 72.

Figure 1:
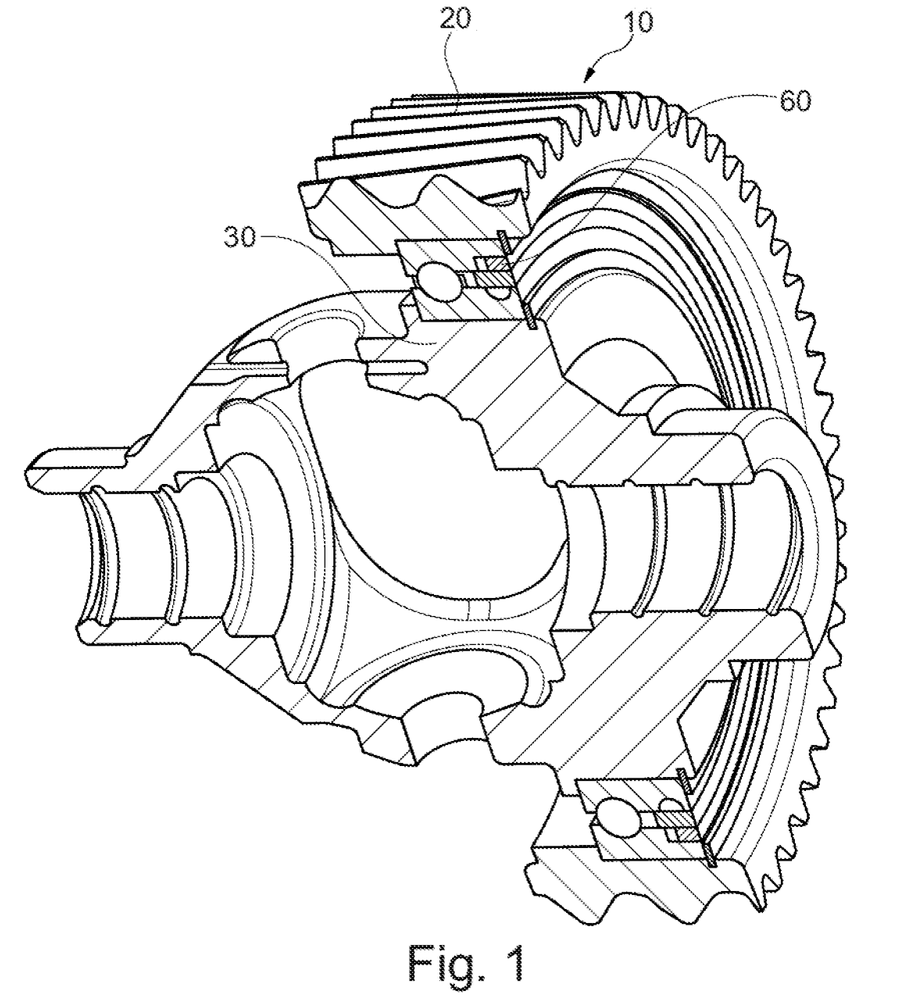
FIG. 1 is a partial cross sectional perspective view of a first embodiment of a drive assembly according to one embodiment.
Figure 2:
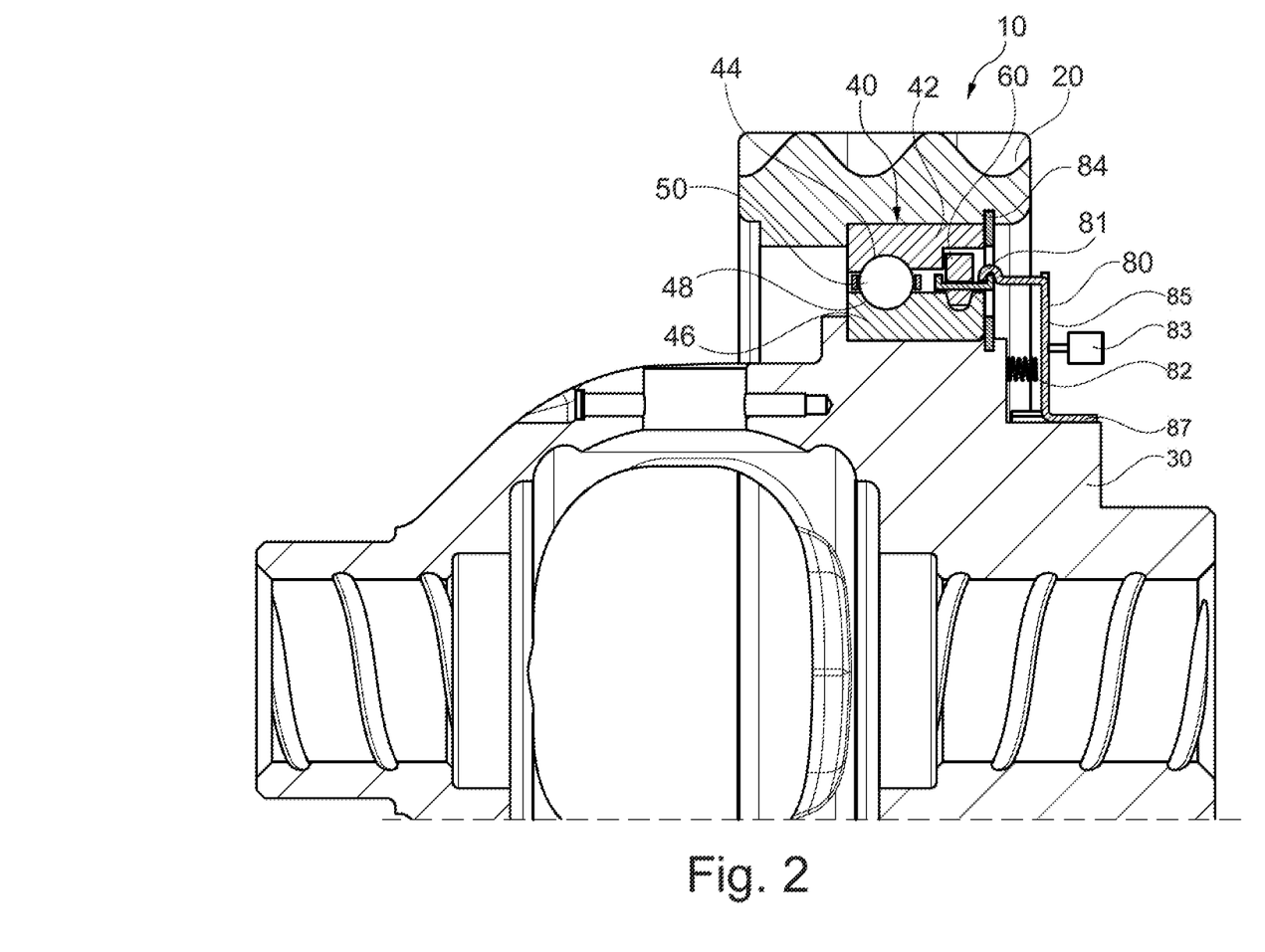
FIG. 2 is a cross sectional view of the drive assembly of FIG. 1.
Figure 3:
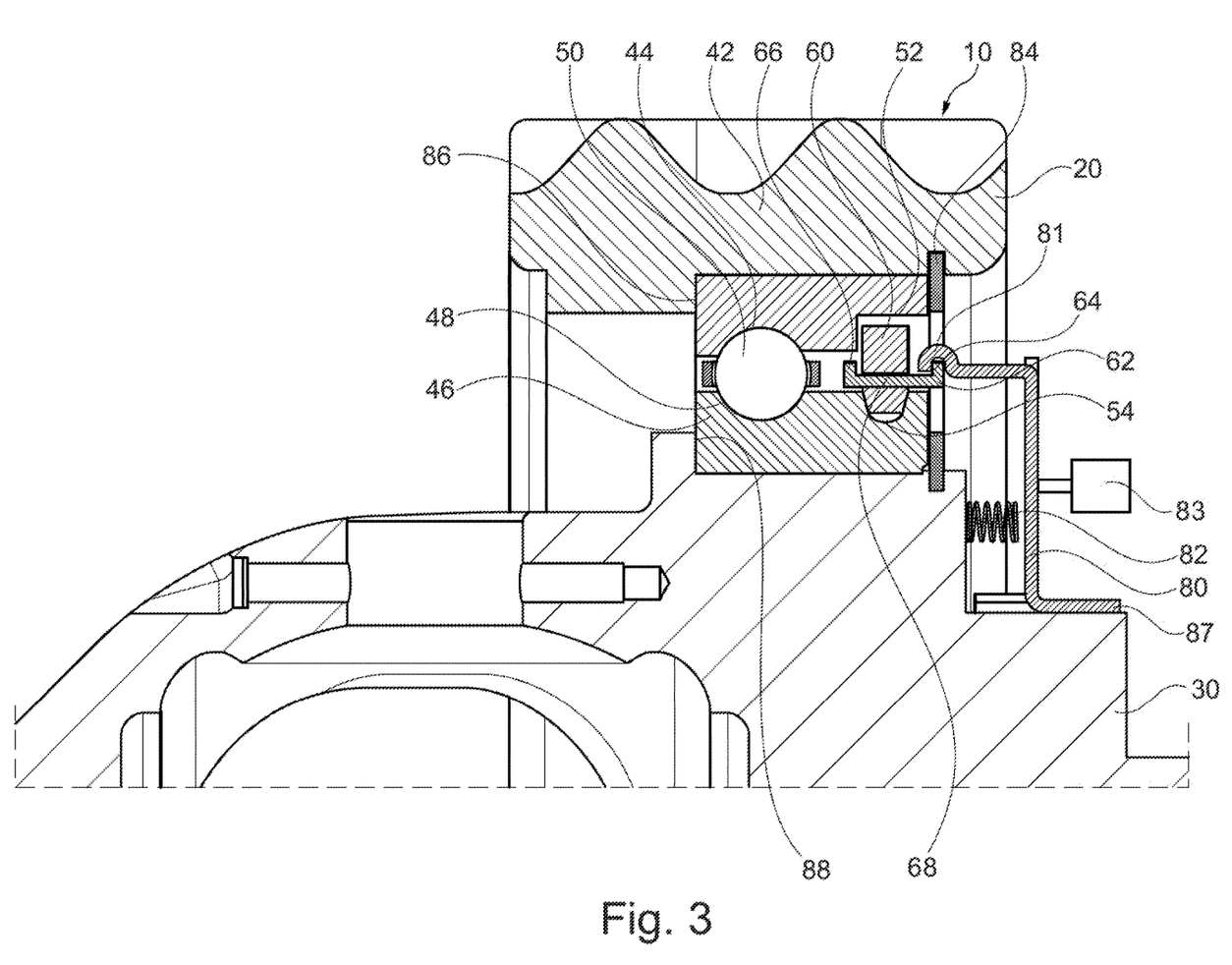
FIG. 3 is magnified a cross sectional view of the drive assembly of FIGS. 1 and 2.

In one embodiment, the actuator assembly 80 is formed as a plate including a radially extending body 85 and an axially extending hook 81 configured to engage the first radial flange 64 of the cage 62. The axially extending hook 81 is shown in FIGS. 2 and 3. One of ordinary skill in the art would recognize that other configurations for the actuator assembly 80 can be used. An axially extending support flange 87 is positioned radially inwardly from the radially extending body 85 and is supported against the output 30. A generic actuator 83 is illustrated in FIGS. 2 and 3. In one embodiment, the actuator 83 is an electromagnetic actuator or a hydraulic actuator. One of ordinary skill in the art would recognize from the present disclosure that alternative forms of actuators can be used.

In one embodiment, a retention ring 84 is provided that retains the outer ring 42 and the inner ring 46. The outer ring 42 is mounted between a first shoulder 86 defined on the input drive gear 20 and the retention ring 84, and the inner ring 46 is mounted between a second shoulder 88 defined on the output 30 and the retention ring 84. One of ordinary skill in the art would recognize from the present disclosure that alternative configurations to retain the outer ring 42 and the inner ring 46 can be used.

Having thus described various embodiments of the present drive assembly in detail, it is to be appreciated and will be apparent to those skilled in the art that many changes, only a few of which are exemplified in the detailed description above, could be made in the drive assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS drive assembly 10
input drive gear 20
output 30
bearing assembly 40
outer ring 42
outer raceway 44
inner ring 46
inner raceway 48
plurality of rolling elements 50
cage 51
plurality of ramps 52
circumferential groove 54
wedge clutch assembly 60
cage 62
first radial flange 64
second radial flange 66
first plurality of tapered crossbars 68
plurality of tapered wedge pockets 70
plurality of wedges 72
ramped surface 74
actuator assembly 80
axially extending hook 81
biasing element 82
actuator 83
retention ring 84
radially extending body 85
first shoulder 86
axially extending support flange 87
second shoulder 88

What is claimed is:
1. A bearing assembly comprising:
a first ring defining a first raceway and including a plurality of ramps;
a second ring defining a second raceway and including a circumferential groove;
a plurality of rolling elements supported to run on the first raceway and the second raceway;
a plurality of wedges each arranged within the circumferential groove and including a ramped surface facing a corresponding one of the plurality of ramps; and
a first cage having a first plurality of tapered crossbars that at least partially define a plurality of tapered wedge pockets, and the plurality of wedges are each arranged within a respective one of the plurality of tapered wedge pockets,
wherein the first plurality of crossbars and the plurality of tapered wedge pockets taper in an axial direction.

2. The bearing assembly of claim 1, further comprising an actuator configured to selectively move the first cage in at least one of a first axial direction or a second axial direction, wherein movement of the first plurality of tapered crossbars in one of the first axial direction or the second axial direction circumferentially drives the plurality of wedges into contact with the circumferential groove.

3. A drive assembly comprising:
an input drive gear;
an output adapted to be selectively driven by the input drive gear; and
the bearing assembly of claim 1, wherein a first one of the first ring or the second ring is arranged on the input drive gear and a second one of the first ring or the second ring is arranged on the output.

4. The drive assembly of claim 3, further comprising:
a first cage having a first plurality of tapered crossbars that at least partially define a plurality of tapered wedge pockets, the plurality of wedges each arranged within a respective one of the plurality of wedge pockets; and,
an actuator configured to selectively move the first cage in at least one of a first axial direction or a second axial direction, wherein movement of the first plurality of tapered crossbars in one of the first axial direction or the second axial direction circumferentially drives the plurality of wedges into contact with the circumferential groove such that the input drive gear drives the output.

5. A drive assembly comprising:
an input drive gear;
an output adapted to be selectively driven by the input drive gear;
a bearing assembly including an outer ring on the input drive gear defining an outer raceway, an inner ring on the output defining an inner raceway, and a plurality of rolling elements supported to run on the outer raceway and the inner raceway, a first one of the outer ring or the inner ring includes a plurality of ramps, and a second one of the outer ring or the inner ring includes a circumferential groove;
a wedge clutch assembly including a first cage having a first plurality of tapered crossbars that at least partially define a plurality of tapered wedge pockets, and a plurality of wedges each arranged within a respective one of the plurality of wedge pockets and within the circumferential groove of the second one of the outer ring or the inner ring, the plurality of wedges each including a ramped surface facing a corresponding one of the plurality of ramps; and
an actuator configured to selectively move the first cage in at least one of a first axial direction or a second axial direction;
movement of the first plurality of tapered crossbars in one of the first axial direction or the second axial direction circumferentially drives the plurality of wedges into contact with the circumferential groove such that the input drive gear drives the output.

6. The drive assembly of claim 5, further comprising a biasing element configured to move the cage in the second axial direction.

7. The drive assembly of claim 5, wherein the first cage includes a second plurality of tapered crossbars having a taper opposite to a taper of the first plurality of tapered crossbars, and movement in the other of the first axial direction or the second axial direction drives the plurality of wedges out of contact with the circumferential groove such that the input drive gear freely rotates with respect to the output.

8. The drive assembly of claim 5, wherein the plurality of ramps each define a first profile, and the ramped surfaces of the plurality of wedges each define a second profile that is complementary to the first profile.

9. The drive assembly of claim 5, wherein the first one of the outer ring or the inner ring including the plurality of ramps is the outer ring, and the second one of the outer ring or the inner ring including the circumferential groove is the inner ring.

10. The drive assembly of claim 5, further comprising a second cage supporting the plurality of rolling elements.

11. The drive assembly of claim 5, wherein the actuator is an electromagnetic actuator or a hydraulic actuator.

12. The drive assembly of claim 6, wherein the biasing element is a coil spring.

13. The drive assembly of claim 5, wherein the cage includes a first radial flange and a second radial flange, and the actuator includes an actuator plate including a radially extending body and an axially extending hook that engages the first radial flange of the first cage.

14. A method of driving an output, the method comprising:
providing a drive assembly including:
an input drive gear;
an output adapted to be selectively driven by the input drive gear;
a bearing assembly including an outer ring on the input drive gear defining an outer raceway, an inner ring on the output defining an inner raceway, and a plurality of rolling elements supported to run on the outer raceway and the inner raceway, a first one of the outer ring or the inner ring includes a plurality of ramps, and a second one of the outer ring or the inner ring includes a circumferential groove;
a wedge clutch assembly including a first cage having a first plurality of tapered crossbars that at least partially define a plurality of tapered wedge pockets, and a plurality of wedges each arranged within a respective one of the plurality of wedge pockets and within the circumferential groove of the second one of the outer ring or the inner ring, the plurality of wedges each including a ramped surface facing a corresponding one of the plurality of ramps;
a biasing element configured to move the first cage in the second axial direction;
an actuator configured to axially move the first cage in at least one of a first axial direction or a second axial direction; and
driving the first plurality of tapered crossbars in one of the first axial direction or the second axial direction by the actuator or the biasing element to circumferentially drive the plurality of wedges into contact with the circumferential groove such that the input drive gear drives the output.

15. The method of claim 14, further comprising providing a biasing element configured to axially move the first cage in the second axial direction.

16. The method of claim 14, wherein the first cage includes a second plurality of tapered crossbars having a taper opposite to a taper of the first plurality of tapered crossbars, and movement in the other of the first axial direction or the second axial direction drives the plurality of wedges out of contact with the circumferential groove such that the input drive gear freely rotates with respect to the output.

17. The method of claim 14, wherein the plurality of ramps each define a first profile, and the ramped surfaces of the plurality of wedges each define a second profile that is complementary to the first profile.

18. The method of claim 14, wherein the first one of the outer ring or the inner ring including the plurality of ramps is the outer ring, and the second one of the outer ring or the inner ring including the circumferential groove is the inner ring.

19. The method of claim 14, further comprising a second cage supporting the plurality of rolling elements.

* * * * *